US008553668B2

(12) United States Patent
Roh et al.

(10) Patent No.: US 8,553,668 B2
(45) Date of Patent: Oct. 8, 2013

(54) SIGNAL TRANSMISSION METHOD USING CDM AGAINST THE EFFECT OF CHANNEL ESTIMATION ERROR IN TRANSMIT DIVERSITY SYSTEM

(75) Inventors: Dong Wook Roh, Gyeonggi-do (KR); Bong Hoe Kim, Gyeonggi-do (KR); Suk Hyon Yoon, Gyeonggi-do (KR); Dong Youn Seo, Gyeonggi-do (KR); Jung Hoon Lee, Gyeonggi-do (KR); Dae Won Lee, Gyeonggi-do (KR); Hak Seong Kim, Gyeonggi-do (KR); Joon Kui Ahn, Gyeonggi-do (KR); Ki Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/669,441

(22) PCT Filed: Aug. 12, 2008

(86) PCT No.: PCT/KR2008/004681
§ 371 (c)(1),
(2), (4) Date: Jan. 15, 2010

(87) PCT Pub. No.: WO2009/022843
PCT Pub. Date: Feb. 19, 2009

(65) Prior Publication Data
US 2010/0182988 A1    Jul. 22, 2010

Related U.S. Application Data

(60) Provisional application No. 60/955,863, filed on Aug. 14, 2007.

(30) Foreign Application Priority Data

Jan. 29, 2008   (KR) .................. 10-2008-0009040

(51) Int. Cl.
*H04B 7/216*   (2006.01)

(52) U.S. Cl.
USPC ...................................... 370/342

(58) Field of Classification Search
USPC ......... 370/203, 204–215, 229–240, 241–253, 370/310–337, 338–350, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS 5,175,867 A      12/1992  Wejke et al.
6,359,923 B1 *   3/2002   Agee et al. .................. 375/130

(Continued)

FOREIGN PATENT DOCUMENTS

CN    1797986       7/2006
CN    101013917     8/2007

(Continued)

OTHER PUBLICATIONS

Samsung, "UL reference signal multiplexing", R1-063257, 3GPP TSG RAN WG1 Meeting #47, Nov. 2006.

(Continued)

*Primary Examiner* — Jung-Jen Liu
(74) *Attorney, Agent, or Firm* — Lee, Hong, Degerman, Kang & Waimey

(57) ABSTRACT

A method of transmitting a signal using code division multiplexing (CDM) in order to reduce the influence of channel estimation error in a multi-input multi-output antenna (MIMO) system using transmit diversity is disclosed. That is, the method of transmitting a signal by a transmitter using a plurality of antennas includes code division multiplexing input symbols using codes according to a predetermined spreading matrix, and transmitting the code division multiplexed symbols via the plurality of antennas according to an Alamouti scheme. At this time, the predetermined spreading matrix is set such that a first component and a second component configuring interference due to channel estimation error have orthogonal phases.

2 Claims, 4 Drawing Sheets

(56) References Cited

U.S. PATENT DOCUMENTS

| | | | |
|---|---|---|---|
| 6,480,522 B1 * | 11/2002 | Hoole et al. | 375/130 |
| 6,621,851 B1 * | 9/2003 | Agee et al. | 375/130 |
| 6,628,956 B2 | 9/2003 | Bark et al. | |
| 6,804,307 B1 * | 10/2004 | Popovic | 375/299 |
| 6,873,606 B2 * | 3/2005 | Agrawal et al. | 370/310 |
| 7,106,781 B2 * | 9/2006 | Agee et al. | 375/141 |
| 7,149,238 B2 * | 12/2006 | Agee et al. | 375/141 |
| 7,430,244 B2 * | 9/2008 | Chung et al. | 375/267 |
| 7,433,347 B1 * | 10/2008 | Trott et al. | 370/347 |
| 7,469,015 B2 * | 12/2008 | Le Nir et al. | 375/267 |
| 7,577,085 B1 * | 8/2009 | Narasimhan | 370/206 |
| 7,623,441 B1 * | 11/2009 | Sampath et al. | 370/206 |
| 7,675,886 B2 * | 3/2010 | Agrawal et al. | 370/334 |
| 7,720,168 B2 * | 5/2010 | Su et al. | 375/267 |
| 7,724,639 B1 * | 5/2010 | Porat et al. | 370/208 |
| 7,724,838 B2 * | 5/2010 | Mantravadi | 375/295 |
| 7,773,685 B2 * | 8/2010 | Tirkkonen et al. | 375/267 |
| 7,852,806 B2 | 12/2010 | Ahn et al. | |
| 7,869,402 B2 | 1/2011 | Yoon et al. | |
| 7,881,222 B2 | 2/2011 | Lee et al. | |
| 7,889,633 B2 * | 2/2011 | Noh et al. | 370/208 |
| 7,894,330 B2 | 2/2011 | Lee et al. | |
| 7,920,638 B2 * | 4/2011 | Le Nir et al. | 375/267 |
| 7,929,563 B2 * | 4/2011 | Wang et al. | 370/430 |
| 7,991,063 B2 * | 8/2011 | Khan et al. | 375/260 |
| 8,014,769 B2 | 9/2011 | Lee et al. | |
| 8,019,332 B2 | 9/2011 | Lee et al. | |
| 8,027,297 B2 | 9/2011 | Kim et al. | |
| 8,031,583 B2 | 10/2011 | Classon et al. | |
| 8,031,668 B2 | 10/2011 | Wang et al. | |
| 8,036,197 B2 | 10/2011 | Pajukoski et al. | |
| 8,041,362 B2 | 10/2011 | Li et al. | |
| 8,050,227 B2 | 11/2011 | Lee et al. | |
| 8,116,271 B2 | 2/2012 | Pi | |
| 8,155,069 B2 | 4/2012 | Chun et al. | |
| 2003/0067907 A1 | 4/2003 | Rezaiifar et al. | |
| 2003/0083069 A1 | 5/2003 | Vadgama | |
| 2003/0185159 A1 | 10/2003 | Seo et al. | |
| 2004/0058687 A1 | 3/2004 | Kim et al. | |
| 2004/0133841 A1 | 7/2004 | Lundby et al. | |
| 2004/0257978 A1 * | 12/2004 | Shao et al. | 370/208 |
| 2005/0052991 A1 | 3/2005 | Kadous | |
| 2005/0068918 A1 * | 3/2005 | Mantravadi et al. | 370/328 |
| 2005/0157680 A1 | 7/2005 | Zhang et al. | |
| 2005/0180328 A1 | 8/2005 | Kim et al. | |
| 2005/0250540 A1 | 11/2005 | Ishii et al. | |
| 2005/0265250 A1 | 12/2005 | Gollamudi et al. | |
| 2006/0018259 A1 | 1/2006 | Kadous | |
| 2006/0023745 A1 | 2/2006 | Koo et al. | |
| 2006/0034240 A1 | 2/2006 | Kwak et al. | |
| 2006/0034383 A1 * | 2/2006 | Su et al. | 375/267 |
| 2006/0035643 A1 | 2/2006 | Vook et al. | |
| 2006/0045010 A1 | 3/2006 | Baker et al. | |
| 2006/0067413 A1 * | 3/2006 | Tsai | 375/260 |
| 2006/0128410 A1 | 6/2006 | Derryberry et al. | |
| 2006/0146867 A1 | 7/2006 | Lee et al. | |
| 2006/0171342 A1 | 8/2006 | Dateki | |
| 2006/0193373 A1 * | 8/2006 | Agee et al. | 375/141 |
| 2007/0011550 A1 | 1/2007 | Agrawal et al. | |
| 2007/0040703 A1 | 2/2007 | Akkarakaran et al. | |
| 2007/0070944 A1 | 3/2007 | Rinne et al. | |
| 2007/0140178 A1 | 6/2007 | Jung et al. | |
| 2007/0165739 A1 * | 7/2007 | Hottinen et al. | 375/267 |
| 2007/0171849 A1 | 7/2007 | Zhang et al. | |
| 2007/0183380 A1 | 8/2007 | Rensburg et al. | |
| 2007/0183384 A1 | 8/2007 | Kwak et al. | |
| 2007/0211656 A1 | 9/2007 | Kwak et al. | |
| 2007/0223618 A1 | 9/2007 | Jeong et al. | |
| 2007/0253465 A1 | 11/2007 | Muharemovic et al. | |
| 2007/0254661 A1 | 11/2007 | Chowdhury et al. | |
| 2007/0286261 A1 | 12/2007 | Molev-Shteiman | |
| 2008/0013610 A1 | 1/2008 | Varadarajan et al. | |
| 2008/0019307 A1 | 1/2008 | Tenny et al. | |
| 2008/0032630 A1 | 2/2008 | Kim et al. | |
| 2008/0037464 A1 | 2/2008 | Lim et al. | |
| 2008/0043874 A1 | 2/2008 | Lee et al. | |
| 2008/0080634 A1 | 4/2008 | Kotecha et al. | |
| 2008/0101211 A1 | 5/2008 | Rao | |
| 2008/0151831 A1 * | 6/2008 | Khan et al. | 370/330 |
| 2008/0159323 A1 | 7/2008 | Rinne et al. | |
| 2008/0182582 A1 | 7/2008 | Bachl et al. | |
| 2008/0192696 A1 | 8/2008 | Sachs et al. | |
| 2008/0232234 A1 | 9/2008 | McCoy et al. | |
| 2008/0232300 A1 | 9/2008 | McCoy et al. | |
| 2008/0233964 A1 | 9/2008 | McCoy et al. | |
| 2008/0267310 A1 * | 10/2008 | Khan et al. | 375/267 |
| 2008/0287155 A1 | 11/2008 | Xu et al. | |
| 2008/0304467 A1 | 12/2008 | Papasakellariou et al. | |
| 2008/0304593 A1 * | 12/2008 | Khan et al. | 375/267 |
| 2008/0310540 A1 | 12/2008 | Tiirola et al. | |
| 2008/0311911 A1 | 12/2008 | Koodli et al. | |
| 2009/0046672 A1 | 2/2009 | Malladi et al. | |
| 2009/0046774 A1 * | 2/2009 | Abou Rjeily | 375/239 |
| 2009/0046789 A1 | 2/2009 | Xu et al. | |
| 2009/0055703 A1 | 2/2009 | Kim et al. | |
| 2009/0073922 A1 | 3/2009 | Malladi et al. | |
| 2009/0097447 A1 | 4/2009 | Han et al. | |
| 2009/0109906 A1 | 4/2009 | Love et al. | |
| 2009/0168922 A1 | 7/2009 | Malladi et al. | |
| 2009/0175233 A1 | 7/2009 | Ojala et al. | |
| 2009/0196240 A1 | 8/2009 | Frederiksen et al. | |
| 2009/0201863 A1 | 8/2009 | Pi et al. | |
| 2009/0201904 A1 | 8/2009 | Lee et al. | |
| 2009/0238131 A1 | 9/2009 | Montojo et al. | |
| 2009/0245187 A1 | 10/2009 | Nam et al. | |
| 2009/0259909 A1 | 10/2009 | Luo | |
| 2009/0274037 A1 | 11/2009 | Lee et al. | |
| 2009/0290597 A1 | 11/2009 | Baumgartner et al. | |
| 2009/0303866 A1 * | 12/2009 | Li et al. | 370/208 |
| 2010/0220708 A1 * | 9/2010 | Mantravadi et al. | 370/343 |
| 2011/0142097 A1 * | 6/2011 | Walton et al. | 375/141 |
| 2011/0292900 A1 | 12/2011 | Ahn et al. | |
| 2012/0033650 A1 | 2/2012 | Ahn et al. | |
| 2012/0087363 A1 | 4/2012 | Jongren et al. | |

FOREIGN PATENT DOCUMENTS

| | | |
|---|---|---|
| EP | 1175022 | 1/2002 |
| EP | 1349292 | 10/2003 |
| EP | 1389848 | 2/2004 |
| EP | 1746855 | 1/2007 |
| EP | 1784036 | 5/2007 |
| EP | 1819088 | 8/2007 |
| JP | 2007028569 | 2/2007 |
| KR | 1020020009079 | 2/2002 |
| KR | 1020060092055 | 8/2006 |
| WO | 0176110 | 10/2001 |
| WO | 2004049613 | 6/2004 |
| WO | 2004051872 | 6/2004 |
| WO | 2005074312 | 8/2005 |
| WO | 2005099103 | 10/2005 |
| WO | 2005114888 | 12/2005 |
| WO | 2005117319 | 12/2005 |
| WO | 2006/020339 | 2/2006 |
| WO | 2006129749 | 12/2006 |
| WO | 2006138337 | 12/2006 |
| WO | 2007015305 | 2/2007 |
| WO | 2007/066936 | 6/2007 |
| WO | 2007/092258 | 8/2007 |

OTHER PUBLICATIONS

3rd Generation Partnership Project, "Technical Specification Group Radio Access Network; Evolved Universal Terrestrial Radio Access (E-UTRA) Radio Resource Control (RRC); Protocol specification (Release 8)", 3GPP TS 36.331, V8.0.0, Dec. 2007.

3rd Generation Partnership Project, "Technical Specification Group Radio Access Network; Evolved Universal Terrestrial Radio Access (E-UTRA); Radio Resource Control (RRC); Protocol specification (Release 8)", 3GPP TS 36.331, V8.14.0, Jun. 2011.

Nokia, "Data-non-associated Control Signal Transmission with UL Data," 3GPP TSG RAN WG1 Meeting #48, R1-071000, Feb. 2007, XP-002573203.

3rd Generation Partnership Project (3GPP), "Technical Specification Group Radio Access Network; LTE Physical Layer—General Description (Release 8)," 3GPP TS 36.201 v0.11, R1-071252, Mar. 2007, XP-050105207.

LTE Rapporteur (NTT DoCoMo), "Text Proposal for TS 36.300 (Stage 2 TS)," 3GPP TSG RAN WG1 Meeting #48, R1-071251, Feb. 2007, XP-050105206.

Lee, H., et al., "Novel Multi-User MIMO Scheme Based on Successive Interference Cancellation," IEEE International Symposium on Consumer Electronics, Jun. 20, 2007, XP031160370.

LG Electronics, "Allocation of UL ACK/NACK Index," 3GPP TSG RAN WG1#49, R1-072348, May 7, 2007, XP050106077.

LG Electronics, "PHICH Duration and Signaling," 3GPP TSG RAN WG1#50, R1-073476, Aug. 20, 2007, XP050107084.

Ericsson, "E-mail Summary Taking you Forward on Downlink Control Signaling," 3GPP TSG RAN WG1#50bis, R1-074369, Oct. 8, 2007, XP050107884.

Motorola, "PHICH Resource Signaling for TDD & FDD," 3GPP TSG RAN #51bis, R1-080433, Jan. 14, 2007, XP050108952.

Motorola, "PHICH Resource Signaling for TDD & FDD," 3GPP TSG RAN #52bis, R1-081286, Apr. 1, 2008, XP050109724.

Catt, et al., "Indication of PHICH Resource for TDD," 3GPP TSG RAN #52bis, R1-081326, Mar. 31, 2008, XP050109752.

"LS on physical channel definition," R1-073231, 3GPP TSG RAN WG1 Meeting #49bis, Jun. 2007.

Panasonic, "CQI Feedback Control and Content in E-UTRA", 3GPP TSG-RAN WG1 Meeting #49, R1-072077, May 7, 2007, XP050105831.

Motorola, "Search Space Definition for L1/L2 Control Channels," R1-072691, 3GPP TSG RAN1 #49bis, Jun. 2007.

Mitsubishi Electric, "UE and CCE specific scrambling codes for low complexity blind detection of downlink control signaling," R1-072063, 3GPP TSG RAN WG1 #49 meeting, May 2007.

Bo Goransson et al., "Evolution of WCDMA high speed packet access and broadcast services", IEEE 8th Workshop on Signal Processing Advances in Wireless Communications (SPAWC), Jun. 2007, XP-031189506.

"Part 16: Air Interface for Broadband Wireless Access Systems", P802.16Rev2/D0b, pp. 1-1754, Jun. 2007, XP-017631176.

Nokia, "Data-non-associated control signal transmission with UL data", R1-071000, 3GPP TSG-RAN WG1 Meeting #48, Feb. 2007.

United States Patent and Trademark Office Application U.S. Appl. No. 12/532,944, Final Office Action dated Feb. 5, 2013, 16 pages.

State Intellectual Property Office of the People's Republic of China Application Serial No. 200880112054.X, Office Action dated Feb. 1, 2013, 6 pages.

United States Patent and Trademark Office Application U.S. Appl. No. 12/673,745, Office Action dated Mar. 1, 2013, 11 pages.

United States Patent and Trademark Office Application U.S. Appl. No. 12/532,733, Final Office Action dated Mar. 13, 2013, 8 pages.

State Intellectual Property Office of the People's Republic of China Application Serial No. 200880112054.X Office Action dated Feb. 1, 2013, 6 pages.

* cited by examiner

SIGNAL TRANSMISSION METHOD USING CDM AGAINST THE EFFECT OF CHANNEL ESTIMATION ERROR IN TRANSMIT DIVERSITY SYSTEM

CROSS-REFERENCE TO RELATED APPLICATIONS

This application is the National Stage filing under 35 U.S.C. §371 of International Application No. PCT/KR2008/004681, filed on Aug. 12, 2008, which claims the benefit of earlier filing date and right of priority to Korean Application No. 10-2008-0009040, filed on Jan. 29, 2008, and also claims the benefit of U.S. Provisional Application Ser. No. 60/955,863, filed on Aug. 14, 2007.

TECHNICAL FIELD

The present invention relates to a method of transmitting a signal using code divisional multiplexing (CDM) in a multi-input multi-output (MIMO) antenna system, and more particularly, to a method of performing the CDM using orthogonal codes which are improved in order to minimize interference due to channel estimation error and transmitting a signal.

BACKGROUND ART

First, a MIMO technology applied to the present invention will be briefly described.

The MIMO is abbreviated from the term "multi-input multi-output" and indicates a method of employing multiple transmission antennas and multiple reception antennas so as to improve transmission/reception data efficiency, instead of a conventional method using one transmission antenna and one reception antenna. That is, a transmitter or a receiver of a radio communication system uses multiple antennas so as to increase communication capacity or improve transmission/reception performance.

The MIMO technology indicates a technology of collecting data pieces received via several antennas without depending on a single antenna path in order to receive one message. According to the MIMO technology, a data transmission rate is improved in a specific range or a system range can be increased with respect to a specific data transmission rate. That is, the MIMO technology is the next-generation mobile communication technology which is widely applicable to mobile communication terminals and repeaters.

The MIMO technology is attracting attention as the next-generation technology to overcome the restricted transmission amount of the mobile communication that has reached the limit due to the data communication extension. Since the next-generation mobile communication requires a data transmission rate significantly higher than that of the existing mobile communication, the efficient MIMO technology is expected to be required.

Among various technologies of improving transmission efficiency which are currently being researched, the MIMO technology of using multiple antennas in both a transmitter and a receiver is attracting most attention as a method of remarkably improving communication capacity and transmission/reception performance with increasing additional frequency allocation or power consumption.

FIG. 1 is a view showing the configuration of a general MIMO antenna system.

As shown in FIG. 1, if the number of antennas is increased in both a transmitter and a receiver, a theoretical channel transmission capacity is increased in proportion to the number of antennas, unlike the case where multiple antennas are used in only one of the transmitter and the receiver. Thus, frequency efficiency can be remarkably improved.

After the increase in the theoretical capacity of the MIMO system was proved in the mid-1990s, various technologies of substantially improving a data transmission rate have been actively developed up to now. Among them, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The MIMO technology includes a spatial diversity method for increasing transmission reliability using symbols passing through various channel paths and a spatial multiplexing method for improving a transmission rate by simultaneously transmitting a plurality of data symbols using a plurality of transmission antennas. Recently, researches into a method of obtaining the respective advantages of the two methods by combining the two above-described methods are ongoing.

Hereinafter, the methods will be described in detail.

First, the spatial diversity method includes a space-time block coding method and a space-time trellis coding method using both a diversity gain and a coding gain. Generally, the trellis coding method is excellent in view of the improvement of a bit error rate and the degree of freedom for code generation, but the space-time block coding method is advantageous in that computation complexity is simple. A spatial diversity gain can be obtained from a product of the number of transmission antennas and the number of reception antennas. Instead of the space-time coding method, a "space-frequency coding method" based on a frequency domain instead of a time domain may be used. At this time, the same coding method may be applied without change.

Second, the spatial multiplexing method indicates a method of transmitting different data streams via transmission antennas. At this time, in a receiver, mutual interference is generated between data which are transmitted from a transmitter. The receiver eliminates the interference using an adequate signal processing method and receives the data. The receiver for eliminating noise, which is used herein, includes a maximum likelihood receiver, a zero forcing (ZF) receiver, a minimum mean-squared errors (MMSE) receiver, a Diagonal Bell Laboratories Layered Space-Time (D-BLAST) receiver and a Vertical Bell Laboratory Layered Space-Time (V-BLAST) receiver. In particular, if the transmitter knows channel information, a singular value decomposition (SVD) method may be used.

Third, a combination of the spatial diversity method and the spatial multiplexing method may be used. If only the spatial diversity gain is obtained, a performance improvement gain according to the increase in diversity order is gradually saturated. If only the spatial multiplexing gain is obtained, the transmission reliability of the radio channel deteriorates. Accordingly, researches into the methods of obtaining both the two gains while solving the above-described problems have been conducted. Among them, a Double Space-Time Transmit Diversity (Double-STTD) or Space-Time Bit Interleaved Coded Modulation (STBICM) may be used.

Hereinafter, a method of using an Alamouti code for transmission diversity in the MIMO system will be described.

In a transmission diversity (hereinafter, abbreviated to "Tx Div") structure using the Alamouti code, if the receiver is changed to an equivalent receiver shown in FIG. 2, the receiver may be easily analyzed.

FIG. 2 is a view showing the structure of the equivalent receiver in order to facilitate the description of the system using the Alamouti code.

That is, if a conjugate complex number is applied to a second receiving signal for mathematical modeling of the receiving signal in the diversity transmission method using the Alamouti code, more efficient mathematical modeling is possible. FIG. 2 shows that the receiving signal can be expressed in a matrix form by applying the conjugate complex number to the receiver at a time 2 or a frequency 2. Hereinafter, the detailed mathematical modeling using the conjugate complex number will be described.

As the matrix of the Alamouti code, two matrixes can be considered as follows.

$$\begin{bmatrix} s_1 & -s_2^* \\ s_2 & s_1^* \end{bmatrix} \quad \text{Equation 1}$$

$$\begin{bmatrix} s_1 & s_2 \\ -s_2^* & s_1^* \end{bmatrix} \quad \text{Equation 2}$$

In the matrixes of Equation 1 and Equation 2, each column denotes a time or a frequency and each row denotes the antenna. In more detail, the matrix of Equation 1 indicates a general equation of a matrix which is first suggested in the paper of Alamouti, and Equation 2 indicates a matrix used in the $3^{rd}$ Generation Partnership Project Long Term Evolution (3GPP LTE) standard. That is, Equation 2 indicates a matrix which is reconfigured such that the signal transmitted via an antenna 1 in a single-input single-output (SISO) system using only one antenna is equal to the signal transmitted via the antenna 1 in an Alamouti system.

In the above-described equations, if each column denotes the time, the Alamouti code is used as a kind of a space time block code (STBC) and, if each column denotes the frequency, the Alamouti code is used as a kind of a space frequency block code (SFBC).

Now, the detailed description will be made with reference to FIG. 2.

When the transmission diversity of the Alamouti system is used, the receiving signal may be expressed as follows. Hereinafter, the STBC that the columns of Equation 1 and Equation 2 denote the time will be described. However, the same mathematical modeling is applicable to the SFBC that the columns of Equation 1 and Equation 2 denote the frequency. If the signals of a time 1 and a time 2 are expressed by y1 and y2, the signals y1 and y2 are expressed by the following equation.

$$\begin{cases} y_1 = h_1 s_1 + h_2 s_2 + n_1 \\ y_2 = -h_1 s_2^* + h_2 s_1^* + n_2 \end{cases} \quad \text{Equation 3}$$

In Equation 3, $n_1$ and $n_2$ denote noises generated in the reception antennas, $s_1$ and $s_2$ denote the transmitting signals at the time 1 and the time 2, and $h_1$ and $h_2$ denote the transmission channel values of the antennas.

At this time, as shown in FIG. 2, if a conjugate complex number is applied to the receiving signal of the second time, the signals are expressed by the following equation.

$$\begin{cases} y_1 = h_1 s_1 + h_2 s_2 + n_1 \\ y_2^* = -h_1^* s_2 + h_2^* s_1 + n_2 \end{cases} \quad \text{Equation 4}$$

If the model of the receiving signal of Equation 4 is expressed by a vector and a matrix, the following equation is obtained.

$$\begin{bmatrix} y_1 \\ y_2^* \end{bmatrix} = \begin{bmatrix} h_1 & h_2 \\ h_2^* & -h_1^* \end{bmatrix} \begin{bmatrix} s_1 \\ s_2 \end{bmatrix} + \begin{bmatrix} n_1 \\ n_2 \end{bmatrix} \quad \text{Equation 5}$$

$$y = H_{eff} s + n$$

where, $H_{eff}$ denotes an efficient channel.

If channel estimation is complete, the decision statistic z of the receiving signal expressed by the above-described equation is as follows. That is, in the receiving process, the receiving signal is multiplied by Hermitian of the efficient channel $H_{eff}$.

$$z = H_{eff}^H y \quad \text{Equation 6}$$
$$= H_{eff}^H H_{eff} s + H_{eff}^H n$$
$$= \|h\|_F^2 s + \hat{n}$$

where, it is noted that $H_{eff}^H H_{eff} = \|h\|_F^2 I$ and $Var(\hat{n}) = \|h\|_F^2 \sigma^2 I$. In addition, I denotes a unit matrix and $\|\ \|_F^2$ denotes a Frobenius norm ($l_2$ norm).

As a result, a decision variable may be expressed as follows.

$$z_i = \|h\|_F^2 s_i + \hat{n}_i, \text{ where } I=1,2 \quad \text{Equation 7}$$

A signal to interference plus noise ratio (SINR) of the decision variable may be expressed by the following equation.

$$\rho = \frac{(\|h\|_F^2)^2 E_s}{\|h\|_F^2 \sigma^2} = \|h\|_F^2 \frac{E_s}{\sigma^2} \quad \text{Equation 8}$$

When the receiving signal is multiplied by the Hermitian of the efficient channel in the receiving process, channel estimation error is considered. In a range in which the generality representing the effect of the channel estimation error is not lost, for convenience of computation, only phase error is considered and a magnitude is not considered in view of the channel estimation error. In addition, a noise signal is ignored.

$$\begin{bmatrix} \hat{s}_1 \\ \hat{s}_2^* \end{bmatrix} = \begin{bmatrix} h_1^* e^{-j\theta_1} & h_2 e^{j\theta_2} \\ -h_2^* e^{-j\theta_2} & h_1 e^{j\theta_1} \end{bmatrix} \begin{bmatrix} h_1 & -h_2 \\ h_2^* & h_1^* \end{bmatrix} \begin{bmatrix} s_1 \\ s_2^* \end{bmatrix}$$

$$= \begin{bmatrix} (h_1 h_1^* e^{-j\theta_1} + h_2 h_2^* e^{j\theta_2})s_1 + (-h_1^* h_2 e^{-j\theta_1} + h_1^* h_2 e^{j\theta_2})s_2^* \\ -(-h_1 h_2^* e^{j\theta_1} + h_1 h_2^* e^{-j\theta_2})s_1 + (h_1 h_1^* e^{j\theta_1} + h_2 h_2^* e^{-j\theta_2})s_2^* \end{bmatrix}$$

$$= \begin{bmatrix} \alpha s_1 + \beta s_2^* \\ -\beta^* s_1 + \alpha^* s_2^* \end{bmatrix}$$

where
$\alpha \equiv (h_1 h_1^* e^{-j\theta_1} + h_2 h_2^* e^{j\theta_2})$
and
$\beta \equiv (-h_1^* h_2 e^{-j\theta_1} + h_1^* h_2 e^{j\theta_2})$ Equation 9

In Equation 9, $\hat{s}_i$ denotes the estimation signal of an $i^{th}$ transmitting signal $s_i$ and $\theta_i$ denotes the phase error of the $i^{th}$ antenna due to the channel estimation error. In Equation 9, $\alpha$ denotes the gain of a desired signal when the channel estimation error is considered and $\beta$ denotes the magnitude of an interference signal due to the channel estimation error.

Equation 9 may be expressed as follows.

$$\begin{bmatrix} \hat{s}_1 \\ \hat{s}_2 \end{bmatrix} = \begin{bmatrix} (h_1 h_1^* e^{-j\theta_1} + h_2 h_2^* e^{j\theta_2})s_1 + (-h_1^* h_2 e^{-j\theta_1} + h_1^* h_2 e^{j\theta_2})s_2^* \\ (-h_1^* h_2 e^{-j\theta_1} + h_1^* h_2 e^{j\theta_2})s_1^* + (h_1 h_1^* e^{-j\theta_1} + h_2 h_2^* e^{j\theta_2})s_2 \end{bmatrix}$$

$$= \begin{bmatrix} \alpha s_1 + \beta s_2^* \\ \alpha s_2 - \beta s_1^* \end{bmatrix}$$

where
$\alpha \equiv (h_1 h_1^* e^{-j\theta_1} + h_2 h_2^* e^{j\theta_2})$
and
$\beta \equiv (-h_1^* h_2 e^{-j\theta_1} + h_1^* h_2 e^{j\theta_2})$ Equation 10

That is, if the channel estimation error is generated, the transmitting signal may be changed to Equation 10 and may have an influence on the reception performance of the receiver.

DISCLOSURE

Technical Problem

An object of the present invention devised to solve the problem lies on a method of transmitting a signal using code division multiplexing (CDM), which is capable of reducing the influence of channel estimation error, and more particularly, orthogonal spread codes capable of reducing the influence of channel estimation error.

Another object of the present invention devised to solve the problem lies on a method of using an improved Hadamard matrix and a method of using an improved Discrete Fourier Transform (DFT) matrix as an orthogonal code, which is applicable when a block Alamouti scheme is used in a transmit diversity scheme using four antennas, and a method of transmitting a signal using the CDM and the Alamouti scheme.

Technical Solution

The object of the present invention can be achieved by providing a method of transmitting a signal by a transmitter using a plurality of antennas, the method including: code division multiplexing input symbols using codes according to a predetermined spreading matrix; and transmitting the code division multiplexed symbols via the plurality of antennas according to an Alamouti scheme, wherein the predetermined spreading matrix is set such that a first phase of a first component and a second phase of a second component are orthogonal to each other, and the first component and the second component configures interference due to channel estimation error.

At this time, the number of antennas may be 4 and the Alamouti scheme may be a 4-antenna block Alamouti (4-Tx block Alamouti) scheme.

In this case, the predetermined spreading matrix may be a matrix obtained by multiplying any one of four columns of a 4*4 Hadamard matrix by j (imaginary unit). Alternatively, the predetermined spreading matrix may be a 4*4 Discrete Fourier Transform (DFT) matrix in which a first column and a second column or a third column and a fourth column of the first, second, third and fourth columns configuring the 4*4 DFT matrix are cyclic-shifted in column-wise direction.

Advantageous Effects

If a signal is transmitted according to the embodiment of the present invention, it is possible to reduce a maximum interference amount even when channel estimation error is generated and transmit a signal which is robust against the channel estimation error.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
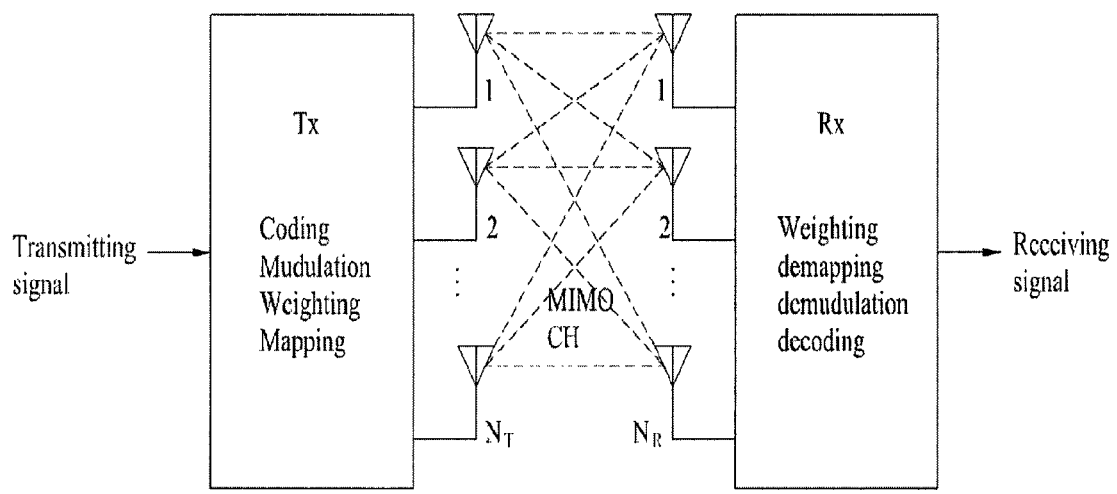
FIG. 1 is a view showing the configuration of a general multi-input multi-output (MIMO) system.
Figure 2:
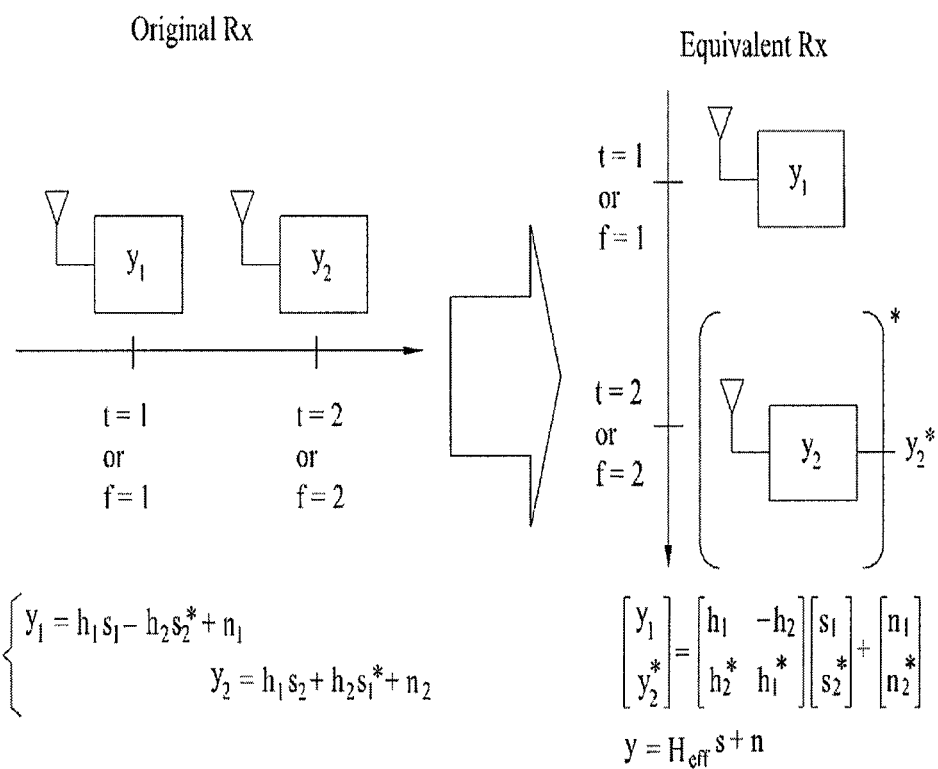
FIG. 2 is a view showing the structure of an equivalent receiver, in order to facilitate the description of a system using an Alamouti code.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form. The same reference numbers will be used throughout the drawings to refer to the same or like parts.

As described above, the present invention provides a code division multiplexing (CDM) method capable of reducing the influence of channel estimation error and more particularly orthogonal codes, which are applicable when a block Alamouti scheme is used in a transmit diversity scheme using four antennas, a Discrete Fourier Transform (DFT) method, and a method of performing CDM using the same.

The transmit diversity scheme using four antennas will be first described.

Generally, there are various methods of implementing the transmit diversity using four antennas. Here, it is assumed that Alamouti matrixes for two antennas, which are simplest forms, are arranged in a block diagonal matrix form. At this time, the matrix equation is as follows.

$$\begin{bmatrix} Alamouti_{2\times 2} & 0_{2\times 2} \\ 0_{2\times 2} & Alamouti_{2\times 2} \end{bmatrix} = \begin{bmatrix} s_1 & s_2 & 0 & 0 \\ -s_2^* & s_1^* & 0 & 0 \\ 0 & 0 & s_3 & s_4 \\ 0 & 0 & -s_4^* & s_3^* \end{bmatrix}$$

Equation 11

The matrix of Equation 11 is a 4×4 matrix in which 2×2 Alamouti matrixes are diagonally arranged. Each row of the matrix corresponds to an antenna and each column thereof corresponds to a time or a frequency. Each of the 2×2 Alamouti matrixes may be used in various forms. Here, a matrix used in the 3GPP LTE standard is used as expressed by Equation 2.

If each column corresponds to the frequency, each Alamouti code is applied to a pair of frequencies, and two frequencies used by a first Alamouti code are different from two frequencies used by a next Alamouti code. Accordingly, in this case, it is considered that the Alamouti code and frequency switched transmit diversity (FSTD) are combined. Accordingly, this is called "SFBC+FSTD". If each column corresponds to the time, this is called "STBC+TSTD". A scheme of applying the Alamouti matrix to the block diagonal matrix is called a block Alamouti scheme.

Hereinafter, the case where CDM information is transmitted in a system using the transmit diversity scheme using four antennas will be described.

Generally, according to the transmit diversity scheme, it is possible to obtain the diversity gain so as to improve transmission/reception performance while slightly decreasing the transmission rate of transmitted information. Accordingly, the transmit diversity scheme is widely used for the transmission of a control signal which requires accurate information transmission, rather than the transmission of a large amount of information.

In the transmit diversity scheme using the four antennas, it is assumed that four symbols are transmitted. At this time, if the four symbols are $s_1$, $s_2$, $s_3$ and $s_4$ and are applied to the above-described SFBC+FSTD, the following equation is expressed.

$$[s_1 \quad s_2 \quad s_3 \quad s_4] \rightarrow \begin{bmatrix} s_1 & s_2 & 0 & 0 \\ -s_2^* & s_1^* & 0 & 0 \\ 0 & 0 & s_3 & s_4 \\ 0 & 0 & -s_4^* & s_3^* \end{bmatrix}$$

Equation 12

In Equation 12, the symbols are transmitted via only two antennas. That is, the diversity order of each symbol is 2. Since the total number of available antennas is 4, a maximum diversity order is 4. This method cannot be considered as an efficient diversity method.

Accordingly, it is considered that the symbols are spread using the CDM by the orthogonal signals of a Hadamard matrix before the four symbols are transmitted. In this case, since the symbols are transmitted via the four antennas, the maximum diversity order is 4.

If the symbols are spread using the Hadamard code before the block Alamouti scheme is applied, the following equation is obtained.

$$[s_1 \quad s_2 \quad s_3 \quad s_4] \rightarrow [s_1 \quad s_2 \quad s_3 \quad s_4]$$

$$W_{4\times 4}^T = [s_1 \quad s_2 \quad s_3 \quad s_4][c_1 \quad c_2 \quad c_3 \quad c_4] =$$

$$s_1 c_1 + s_2 c_2 + s_3 c_3 + s_4 c_4 = \begin{bmatrix} d_1 \\ d_2 \\ d_3 \\ d_4 \end{bmatrix}$$

$$\rightarrow \begin{bmatrix} d_1 & d_2 & 0 & 0 \\ -d_2^* & d_1^* & 0 & 0 \\ 0 & 0 & d_3 & d_4 \\ 0 & 0 & -d_4^* & d_3^* \end{bmatrix}$$

Equation 13

As the example of the orthogonal matrix used in Equation 13, an example of the Hadamard matrix is expressed by the following equation.

$$\begin{bmatrix} c_1^T \\ c_2^T \\ c_3^T \\ c_4^T \end{bmatrix} = \begin{bmatrix} + & + & + & + \\ + & - & + & - \\ + & + & - & - \\ + & - & - & + \end{bmatrix} = W \qquad \text{Equation 14}$$

Hereinafter, if the CDM information is transmitted by the four-antenna transmit diversity scheme using the Alamouti code, the influence of the interference due to the channel estimation error will be described.

First, for convenience of computation, only a spreading sequence constituted by rows of the orthogonal matrix is considered. For example, if a desired code is $c_1$, the correlation between the codes is obtained. First, the codes are expressed by the following equation in consideration of the channel estimation error.

$$\hat{c}_1 = \begin{bmatrix} \alpha + \beta \\ \alpha - \beta \\ \alpha + \beta \\ \alpha - \beta \end{bmatrix} = \alpha \times c_1 + \beta \times c_2 \qquad \text{Equation 15}$$

$$\hat{c}_2 = \begin{bmatrix} \alpha - \beta \\ -\alpha - \beta \\ \alpha - \beta \\ -\alpha - \beta \end{bmatrix} = \alpha \times c_2 - \beta \times c_1$$

$$\hat{c}_3 = \begin{bmatrix} \alpha + \beta \\ \alpha - \beta \\ -\alpha - \beta \\ -\alpha + \beta \end{bmatrix} = \alpha \times c_3 + \beta \times c_4$$

$$\hat{c}_4 = \begin{bmatrix} \alpha - \beta \\ -\alpha - \beta \\ -\alpha + \beta \\ \alpha + \beta \end{bmatrix} = \alpha \times c_4 - \beta \times c_3$$

where $$\alpha \equiv (h_1 h_1^* e^{-j\theta_1} + h_2 h_2^* e^{j\theta_2})$$

and $$\beta \equiv (-h_1^* h_2 e^{-j\theta_1} + h_1^* h_2 e^{j\theta_2})$$

As a result, the correlations between $\hat{c}_1$ and $c_j$ are expressed by the following equation.

$$\hat{c}_1 \cdot c_1 = (\alpha \times c_1 + \beta \times c_2) \cdot c_1 = |c_1|^2 \alpha$$

$$\hat{c}_1 \cdot c_1 = (\alpha \times c_1 + \beta \times c_2) \cdot c_2 = |c_2|^2 \beta$$

$$\hat{c}_1 \cdot c_3 = (\alpha \times c_1 + \beta \times c_2) \cdot c_3 = 0$$

$$\hat{c}_1 \cdot c_4 = (\alpha \times c_1 + \beta \times c_2) \cdot c_4 = 0 \qquad \text{Equation 16}$$

In Equation 16, if the desired code is $\hat{c}_1$, the interferences between the desired code and other codes are not generated, but the interference between the desired code and $c_2$ is $|c_2|^2 \beta$. That is, the interference between the codes should be originally 0 due to the orthogonal property, but the interference between specific codes (for example, between the code 1 and the code 2 in the Hadamard matrix) may be generated due to the channel estimation error.

That is, if the desired code is $c_1$ in the matrix of the following spreading sequence, the correlation between the codes is obtained.

First, the following codes are assumed.

$$\begin{bmatrix} c_1^T \\ c_2^T \\ c_3^T \\ c_4^T \end{bmatrix} = \begin{bmatrix} + & + & + & + \\ + & - & + & - \\ + & + & - & - \\ + & - & - & + \end{bmatrix} \equiv W \qquad \text{Equation 17}$$

The codes of Equation 17 are expressed as follows when the channel estimation error is considered.

$$\begin{bmatrix} c_1^I \\ c_2^T \\ c_3^T \\ c_4^T \end{bmatrix} = \begin{bmatrix} + & + & + & + \\ + & - & + & - \\ + & + & - & - \\ + & - & - & + \end{bmatrix} \rightarrow \alpha \begin{bmatrix} + & + & + & + \\ + & - & + & - \\ + & + & - & - \\ + & - & - & + \end{bmatrix} + \qquad \text{Equation 18}$$

$$\beta \begin{bmatrix} + & - & + & - \\ - & + & - & - \\ + & + & - & + \\ - & + & + & + \end{bmatrix}$$

$$\equiv \alpha W + \beta W_{err}$$

At this time, the channel estimation error after despreading is expressed as follows.

$$(\alpha W + \beta W_{err}) W^H = \alpha \begin{bmatrix} 4 & 0 & 0 & 0 \\ 0 & 4 & 0 & 0 \\ 0 & 0 & 4 & 0 \\ 0 & 0 & 0 & 4 \end{bmatrix} + \beta \begin{bmatrix} 0 & 4 & 0 & 0 \\ -4 & 0 & 0 & 0 \\ 0 & 0 & 0 & 4 \\ 0 & 0 & -4 & 0 \end{bmatrix} \qquad \text{Equation 19}$$

In Equation 19, the interference between the codes should be originally 0 due to the orthogonal property, but the interference between the specific codes may be $4\beta$ due to the channel estimation error. Accordingly, the orthogonal codes need to be modified to be robust against the channel estimation error.

Accordingly, in the following embodiment of the present invention, in the transmit diversity scheme of the block Alamouti scheme, if the information is transmitted by the CDM method, a modified Hadamard matrix obtained by improving the existing Hadamard matrix, a DFT matrix, and a modified DFT matrix are suggested as the orthogonal codes for reducing the interference between the orthogonal codes due to the channel estimation error.

First, in the transmit diversity scheme of the block Alamouti scheme, if the information is transmitted by the CDM method, the general equation of the interference due to the channel estimation error is as follows.

$$c_i = [c_{i1} \ c_{i2} \ c_{i3} \ c_{i4}] \rightarrow \qquad \text{Equation 20}$$

$$\hat{c}_i = \alpha [c_{i1} \ c_{i2} \ c_{i3} \ c_{i4}] + \beta [c_{i2}^* \ -c_{i1}^* \ c_{i4}^* \ -c_{i3}^*]$$

$$= \alpha [c_{i1} \ c_{i2} \ c_{i3} \ c_{i4}] + \beta [c_{i2} \ -c_{i1} \ c_{i4} \ -c_{i3}]^*$$

In Equation 20, c, denotes an $i^{th}$ orthogonal code. $\alpha$ and $\beta$ of Equation 20 are equal to those defined in Equation 9.

The interference between $c_i$ and a $j^{th}$ orthogonal code $c_j$ which is another code is as follows.

$$\hat{c}_i c_j^H = \alpha [c_{i1} \ c_{i2} \ c_{i3} \ c_{i4}] c_j^H +$$
$$\beta [c_{i2}^* \ -c_{i1}^* \ c_{i4}^* \ -c_{i3}^*] c_j^H$$
$$= \beta \times (c_{i2}c_{j1} - c_{i1}c_{j2})^* + \beta \times (c_{i4}c_{j3} - c_{i3}c_{j4})^*$$

Equation 21

In a worst case that Equation 21 has a maximum value, that is, the interference becomes a maximum, the specific orthogonal codes, that is, the $i^{th}$ orthogonal code $c_i$ and the $j^{th}$ orthogonal code $c_j$ satisfy the following equation.

$$\max \hat{c}_i c_j^H = (c_{i2}c_{j1} - c_{i1}c_{j2})^* \times 2\beta$$

$$\Leftrightarrow (c_{i2}c_{j1} - c_{i1}c_{j2})^* = (c_{i4}c_{j3} - c_{i3}c_{j4})^*$$

$$\Leftrightarrow c_{i2}c_{j1} - c_{i1}c_{j2} = c_{i4}c_{j3} - c_{i3}c_{j4} \qquad \text{Equation 22}$$

If the interference becomes the maximum in Equation 22, the orthogonal codes satisfy $c_{i2}c_{j1} - c_{i1}c_{j2} = c_{i4}c_{j3} - c_{i3}c_{j4}$ and the maximum value of the interference when the above-described condition is satisfied is $(c_{i2}c_{j1} - c_{i1}c_{j2})^* \times 2\beta$.

Accordingly, according to an embodiment of the present invention, in order to reduce the maximum value of the interference, the above-described equation is set such that $c_{i2}c_{j1} - c_{i1}c_{j2} \neq c_{i4}c_{j3} - c_{i3}c_{j4}$ is satisfied. Accordingly, it is possible to prevent the interference amount from becoming a maximum.

In an embodiment of the present invention, methods of modifying the existing codes are suggested. Among them, as a simplest method, a method of modifying the orthogonal codes such that the front term of Equation 21 representing the interference between the codes is set to a real number and the back term thereof is set to an imaginary number. In this case, the sum of Equation 21 becomes a vector sum in a complex domain and is reduced to $$\frac{1}{\sqrt{2}},$$

compared with the case where the interference amount becomes the maximum. The principle of this embodiment may be represented by the conceptual diagram of FIG. 3.

Figure 3:
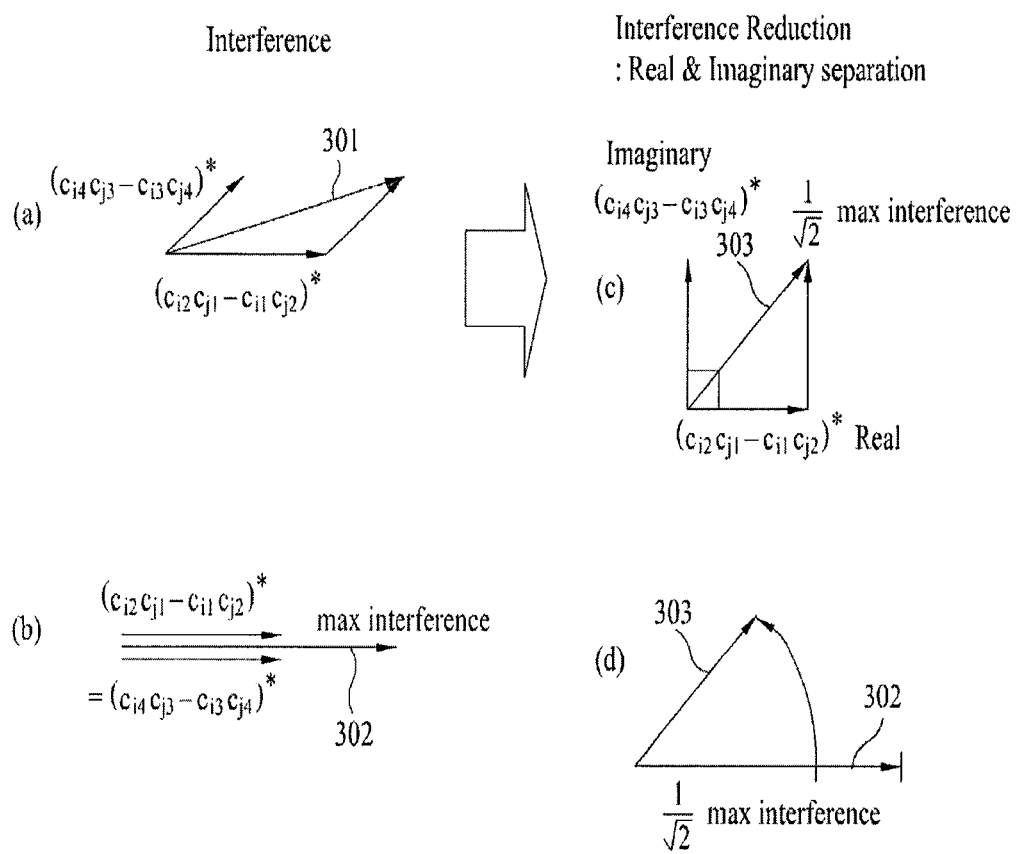
FIG. 3 is a conceptual diagram of a method of preventing an interference amount between codes from becoming a maximum due to channel estimation error, according to an embodiment of the present invention.

FIG. 3 is a conceptual diagram of a method of preventing the interference amount between the codes from becoming the maximum due to channel estimation error, according to an embodiment of the present invention.

First, FIGS. 3A and 3B show the concept of the interference amount due to general channel estimation error. That is, FIG. 3A shows that the interference amount is generated by the magnitude of a vector denoted by a reference numeral 301, which is obtained by the vector sum of $(c_{i4}c_{j3} - c_{i3}c_{j4})^*$ and $(c_{i2}c_{j1} - c_{i1}c_{j2})^*$ in the interference component expressed by Equation 21, and FIG. 3B shows the case where the interference amount becomes the maximum, that is, the case where $(c_{i2}c_{j1} - c_{i1}c_{j2})^*$ and $(c_{i4}c_{j3} - c_{i3}c_{j4})^*$ have the same phase and thus the interference expressed by the vector sum is generated by a vector denoted by a reference numeral 302.

FIGS. 3C and 3D show that the interference generated by the vector sum is generated by a vector denoted by a reference numeral 303 if a specific component (e.g., $(c_{i2}c_{j1} - c_{i1}c_{j2})^*$) of the interference component is a real component and the other component (e.g., $(c_{i4}c_{j3} - c_{i3}c_{j4})^*$) thereof is an imaginary component according to the present embodiment. By the comparison of FIG. 3D, the magnitude of the interference vector 303 according to the present embodiment is reduced to $$\frac{1}{\sqrt{2}}$$

as a maximum, compared with the magnitude of the interference vector 302 of which the interference amount becomes the maximum.

If a simple matrix for implementing the method of the above-described embodiment, for example, the Hadamard matrix is used as the orthogonal code, a product of a first element and a second element of each orthogonal code is set to a real number and a product of a third element and a fourth element is set to an imaginary number. Alternatively, the product of the first element and the second element may be set to the imaginary number and the product of the third element and the fourth element may be set to the real number. As a simple example of the orthogonal code, a method of multiplying one of the columns of the Hadamard matrix by a complex number j may be considered. That is, the method according to the present embodiment can be readily implemented using the following Hamadard matrix.

$$\begin{bmatrix} j & + & + & + \\ j & - & + & - \\ j & + & - & - \\ j & - & - & + \end{bmatrix} \text{ or } \begin{bmatrix} + & j & + & + \\ + & -j & + & - \\ + & j & - & - \\ + & -j & - & + \end{bmatrix} \text{ or }$$

$$\begin{bmatrix} + & + & j & + \\ + & - & j & - \\ + & + & -j & - \\ + & - & -j & + \end{bmatrix} \text{ or } \begin{bmatrix} + & + & + & j \\ + & - & + & -j \\ + & + & - & -j \\ + & - & - & j \end{bmatrix}$$

Equation 23

Hereinafter, the interference due to the channel estimation error generated if the signal is transmitted by the CDM method using the Hamadard matrix suggested in the present embodiment expressed by Equation 23 will be described in detail.

For example, if the Hadamard matrix of Equation 17 is modified and the Hadamard matrix suggested according to the present embodiment such as the third matrix of Equation 23 is used, the following equation is obtained.

$$\begin{bmatrix} + & + & + & + \\ + & - & + & - \\ + & + & - & - \\ + & - & - & + \end{bmatrix} \begin{bmatrix} c_1^T \\ c_2^T \\ c_3^T \\ c_4^T \end{bmatrix} \rightarrow \begin{bmatrix} + & + & j & + \\ + & - & j & - \\ + & + & -j & - \\ + & - & -j & + \end{bmatrix} \equiv K$$

Equation 24

Under this assumption, if the desired code is $c_1$, the correlations between the $c_1$ and the codes are obtained. First, the codes are expressed in consideration of the channel estimation error.

$$\begin{bmatrix} c_1^T \\ c_2^T \\ c_3^T \\ c_4^T \end{bmatrix} = \begin{bmatrix} + & + & j & + \\ + & - & j & - \\ + & + & -j & - \\ + & - & -j & + \end{bmatrix} \rightarrow \alpha \begin{bmatrix} + & + & j & + \\ + & - & j & - \\ + & + & -j & - \\ + & - & -j & + \end{bmatrix} +$$

Equation 25

$$\beta \begin{bmatrix} + & - & + & -j \\ - & + & - & -j \\ + & + & - & j \\ - & + & + & j \end{bmatrix}^*$$

$$= \alpha K + \beta K_{err}$$

The channel estimation error after dispreading is expressed as follows.

$$(\alpha K + \beta K_{err})K^H =$$ Equation 26

$$\alpha \begin{bmatrix} 4 & 0 & 0 & 0 \\ 0 & 4 & 0 & 0 \\ 0 & 0 & 4 & 0 \\ 0 & 0 & 0 & 4 \end{bmatrix} + \beta \begin{bmatrix} 0 & 2-2j & 0 & 2+2j \\ -2+2j & 0 & -2-2j & 0 \\ 0 & 2+2j & 0 & 2-2j \\ -2-2j & 0 & -2+2j & 0 \end{bmatrix}$$

In Equation 26, the interference between the codes should be originally 0 due to the orthogonal property, but the interference between the specific codes is $2\sqrt{2}\beta$ due to the channel estimation error. It can be seen that the interference amount is reduced to $2\sqrt{2}\beta$, compared with the case where the interference amount is $4\beta$ when the Hadamard matrix of Equation 17 is used.

Hereinafter, the case where a Discrete Fourier Transform (DFT) matrix is used as the spread code in order to provide another embodiment of the present invention will be described.

A general 4*4 DFT matrix may be expressed by the following equation.

$$\begin{bmatrix} c_1^T \\ c_2^T \\ c_3^T \\ c_4^T \end{bmatrix} = \begin{bmatrix} + & + & + & + \\ + & -j & - & j \\ + & - & + & - \\ + & j & - & -j \end{bmatrix} \equiv F$$ Equation 27

Even in the present method, the desired code is $c_1$ and the correlations between this code and other codes are computed. First, the codes are expressed by the following equation in consideration of the channel estimation error.

$$\begin{bmatrix} c_1^T \\ c_2^T \\ c_3^T \\ c_4^T \end{bmatrix} = \begin{bmatrix} + & + & + & + \\ + & -j & - & j \\ + & - & + & - \\ + & j & - & -j \end{bmatrix} \rightarrow$$ Equation 28

$$\alpha \begin{bmatrix} + & + & + & + \\ + & -j & - & j \\ + & - & + & - \\ + & j & - & -j \end{bmatrix} + \beta \begin{bmatrix} + & - & + & - \\ -j & - & j & + \\ - & - & - & - \\ j & - & -j & + \end{bmatrix}^*$$

$$= \alpha F + \beta F_{err}$$

The channel estimation error after the dispreading of the codes is performed is expressed as follows.

$$(\alpha F + \beta F_{err})F^H = \alpha \begin{bmatrix} 4 & 0 & 0 & 0 \\ 0 & 4 & 0 & 0 \\ 0 & 0 & 4 & 0 \\ 0 & 0 & 0 & 4 \end{bmatrix} + \beta \begin{bmatrix} 0 & 0 & 4 & 0 \\ 0 & 0 & 0 & 4j \\ -4 & 0 & 0 & 0 \\ 0 & -4j & 0 & 0 \end{bmatrix}$$ Equation 29

That is, even when the signal is spread and transmitted using the DFT matrix of Equation 27, the interference amount due to the channel estimation error is $4\beta$. Accordingly, like the embodiment of using the Hadamard matrix, a method of using an improved DFT matrix may be considered.

Accordingly, as a second embodiment of the present invention, a method of transmitting a signal using an improved DFT matrix as the spread code is suggested. If the DFT matrix is used in the present embodiment, the interference amount is not reduced by a method of multiplying one of the columns of the DFT matrix by the complex number j like the above-described embodiment. This is because the DFT matrix is generated in the form of a Vandemonde matrix.

Accordingly, in the present embodiment, the existing DFT matrix is modified by cyclic-shifting two front columns and two back columns such that the above-described interference reduction reference is satisfied. Various modifications are possible. The case where a third column and a fourth column of the existing DFT matrix are cyclic-shifted downward will be described. This may be expressed by the following equation.

$$\begin{bmatrix} + & + & + & + \\ + & -j & - & j \\ + & - & + & - \\ + & j & - & -j \end{bmatrix} \longrightarrow \begin{bmatrix} c_1^T \\ c_2^T \\ c_3^T \\ c_4^T \end{bmatrix} =$$ Equation 30

$$\begin{bmatrix} + & + & - & -j \\ + & -j & + & + \\ + & - & - & j \\ + & j & + & - \end{bmatrix} \equiv G$$

If the modified DFT matrix G is used for the spreading of the signal according to the present embodiment, the correlations between the desired code $c_1$ and the other codes are calculated. First, the codes are expressed by the following equation in consideration of the channel estimation error.

$$\begin{bmatrix} c_1^T \\ c_2^T \\ c_3^T \\ c_4^T \end{bmatrix} = \begin{bmatrix} + & + & - & -j \\ + & -j & + & + \\ + & - & - & j \\ + & j & + & - \end{bmatrix} \rightarrow$$ Equation 31

$$\alpha \begin{bmatrix} + & + & - & -j \\ + & -j & + & + \\ + & - & - & j \\ + & j & + & - \end{bmatrix} + \beta \begin{bmatrix} + & - & -j & + \\ -j & - & + & - \\ - & - & j & + \\ j & - & - & - \end{bmatrix}^*$$

$$= \alpha G + \beta G_{err}$$

Accordingly, the channel estimation error after the dispreading of the codes is performed is expressed as follows.

$$(\alpha G + \beta G_{err})G^H = \quad \text{Equation 32}$$

$$\alpha \begin{bmatrix} 4 & 0 & 0 & 0 \\ 0 & 4 & 0 & 0 \\ 0 & 0 & 4 & 0 \\ 0 & 0 & 0 & 4 \end{bmatrix} + \beta \begin{bmatrix} 0 & 2 & 2-2j & 2j \\ -2 & 0 & 2j & 2+2j \\ -2+2j & -2j & 0 & -2 \\ -2j & 0 & 2 & 0 \end{bmatrix}$$

The method suggested according to the present embodiment will be described using Equation 32. The interference between the codes should be originally 0, but the interference between specific codes is $2\beta$ or $2\sqrt{2}\beta$ due to the channel estimation error. While the interference amount due to the channel estimation error is $4\beta$ if the existing DFT matrix F or Hadamard matrix W is used, the maximum interference amount is $2\sqrt{2}\beta$, which is reduced by $$\frac{1}{\sqrt{2}}$$

as a maximum, if the method suggested in the present embodiment is used.

Hereinafter, a method of transmitting a signal by the CDM using the suggested Hadamard matrix or DFT matrix according to the present invention will be described.

Figure 4:
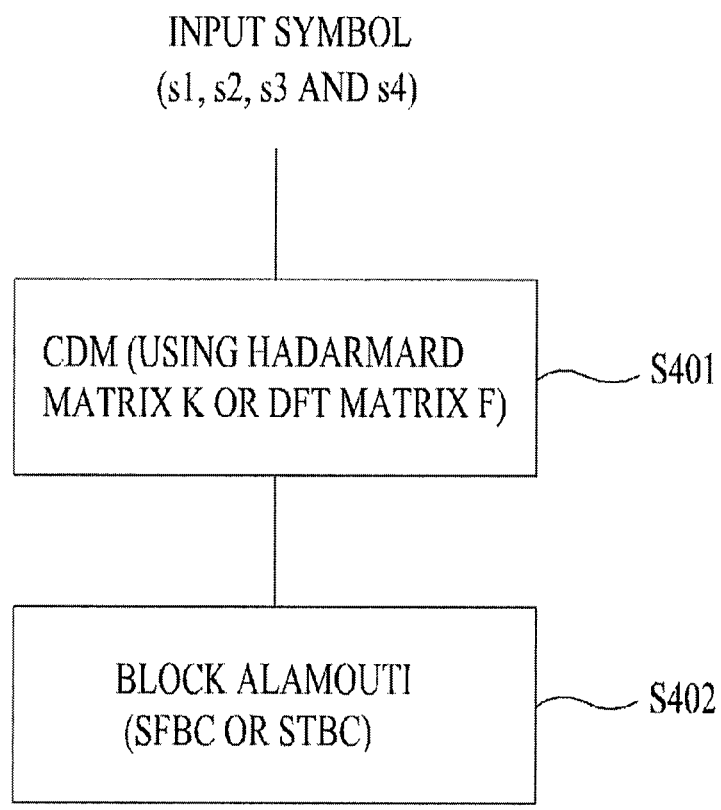
FIG. 4 is a flowchart illustrating a method of transmitting a signal by code division multiplexing (CDM) using a suggested Hadamard matrix or Discrete Fourier Transform (DFT) matrix according to each embodiment of the present invention.

FIG. 4 is a flowchart illustrating a method of transmitting a signal by the CDM using the suggested Hadamard matrix or DFT matrix according to each embodiment of the present invention.

In the present embodiment, it is assumed that the system is a 4-Tx system using four antennas and a 4*4 block Alamouti scheme is used. The input symbols are denoted by $s_1$, $s_2$, $s_3$ and $s_4$.

First, in a step S401, the input symbols are code division multiplexed (CDM) using codes according to a specific spreading matrix. At this time, as the spreading matrix, the 4*4 Hadamard matrix or the 4*4 DFT matrix may be used. If the 4*4 Hadamard matrix is used in the CDM process, it is assumed that any one of the matrixes expressed by Equation 26 suggested according to one embodiment of the present invention is used instead of using the existing Hadamard matrix W expressed by Equation 17. If the 4*4 DFT matrix is used in this CDM process, it is assumed that the improved DFT matrix G expressed by Equation 30 suggested according to another embodiment of the present invention is used instead of using the existing DFT matrix F expressed by the Equation 27. As the DFT matrix which can be used according to the embodiment, various matrixes such as a DFT matrix G in which the cyclic shift is applied like Equation 30, a matrix in which the cyclic shift is applied with respect to two front rows, and a matrix in which the cyclic shift amount is changed may be used.

The CDM symbols are spread and transmitted via a plurality of antennas according to the block Alamouti scheme in a step S402. At this time, the 4*4 block Alamouti scheme expressed by Equation 12 is used. If each column denotes the time, the signal may be transmitted according to the STBC scheme and, if each column denotes the frequency, the signal may be transmitted according to the SFBC scheme.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

In a method of transmitting a signal by CDM in order to reduce the influence of channel estimation error according to the present invention, the signal is code division multiplexed according to an Alamouti scheme as well as the 3GPP LTE system before the signal is transmitted. The present invention is applicable to a radio communication system in which channel estimation error may be generated.

The invention claimed is:

1. A method of transmitting a signal, the method performed by a transmitter using a plurality of antennas and comprising:
    code division multiplexing input symbols using codes according to a predetermined spreading matrix; and
    transmitting the code division multiplexed input symbols via the plurality of antennas according to an Alamouti scheme,
    wherein the predetermined spreading matrix is a matrix obtained by multiplying one of four columns of a 4*4 Hadamard matrix by an imaginary unit to set a product of a first column and a second column of the Hadamard matrix to a real number and a product of a third column and a fourth column of the Hadamard matrix to an imaginary number, or to set a product of a first column and a second column of the Hadamard matrix to an imaginary number and a product of a third column and a fourth column of the Hadamard matrix to a real number.

2. A method of transmitting a signal, the method performed by a transmitter using a plurality of antennas and comprising:
    code division multiplexing input symbols using codes according to a predetermined spreading matrix; and
    transmitting the code division multiplexed input symbols via the plurality of antennas according to an Alamouti scheme,
    wherein the predetermined spreading matrix is obtained by cyclic-shifting a first column and a second column of a 4*4 Discrete Fourier Transform (DFT) matrix or by cyclic-shifting a third column and a fourth column of the 4*4 DFT matrix in a column-wise and row by row.

* * * * *